United States Patent
Senda et al.

(10) Patent No.: US 7,255,807 B2
(45) Date of Patent: Aug. 14, 2007

(54) BOND MAGNET AND FERRITE MAGNETIC POWDER FOR BOND MAGNET

(75) Inventors: Masayasu Senda, Okayama (JP);
Shinichi Suenaga, Okayama (JP);
Keisuke Ayabe, Okayama (JP);
Toshiyuki Sakai, Okayama (JP)

(73) Assignee: Dowa Mining Co., Ltd., Tokyo (JP)

( * ) Notice: Subject to any disclaimer, the term of this patent is extended or adjusted under 35 U.S.C. 154(b) by 254 days.

(21) Appl. No.: 10/829,291

(22) Filed: Apr. 22, 2004

(65) Prior Publication Data

US 2004/0212472 A1     Oct. 28, 2004

(30) Foreign Application Priority Data

Apr. 24, 2003    (JP) .............................. 2003-119518

(51) Int. Cl.
*H01F 1/113*    (2006.01)
(52) U.S. Cl. .................... 252/62.63; 264/611; 264/612
(58) Field of Classification Search .................... None
See application file for complete search history.

(56) References Cited

U.S. PATENT DOCUMENTS

| | | | | |
|---|---|---|---|---|
| 3,677,947 A | * | 7/1972 | Ray et al. ................ | 252/62.54 |
| 4,278,556 A | * | 7/1981 | Tada ........................ | 252/62.54 |
| 4,308,155 A | * | 12/1981 | Tada et al. ............... | 252/62.54 |
| 4,675,170 A | * | 6/1987 | Hibst et al. .............. | 423/594.2 |
| 6,284,150 B1 | * | 9/2001 | Ogata et al. ............. | 252/62.63 |
| 6,478,982 B1 | * | 11/2002 | Anamoto et al. ........ | 252/62.63 |
| 7,025,946 B2 | * | 4/2006 | Suematsu et al. ........ | 423/594.1 |

FOREIGN PATENT DOCUMENTS

JP    9-106904 A    4/1997

* cited by examiner

*Primary Examiner*—C. Melissa Koslow
(74) *Attorney, Agent, or Firm*—Clark & Brody

(57) ABSTRACT

A ferrite magnetic powder for bond magnet that experiences only small decrease in coercivity when molded into a bond magnet is provided, which is a ferrite magnetic powder that includes an alkaline-earth metal constituent and exhibits a decrease in coercivity of not greater than 600 Oe when subjected to a prescribed molding test. The magnetic powder can be obtained by mixing a fine ferrite powder of an average particle diameter of greater than 0.50 to 1.0 μm and a coarse ferrite powder of an average particle diameter of greater than 2.50 to 5.0 μm at ratio to incorporate the fine powder at a content ratio of 15-40 wt %.

1 Claim, No Drawings

BOND MAGNET AND FERRITE MAGNETIC POWDER FOR BOND MAGNET

BACKGROUND OF THE INVENTION

1. Field of the Invention

This invention relates to a ferrite magnetic powder including an alkaline-earth metal constituent, more specifically to a ferrite magnetic powder for bond magnet that experiences only small decrease in coercivity when molded into a bond magnet.

2. Background Art

In order to obtain a bond magnet molded of ferrite magnetic powder and binder that has high magnetic force, it is necessary to increase the ferrite magnetic powder filling factor. JP-Hei9-106904A (Reference) teaches that a bond magnet molded using a ferrite magnetic powder at a filling factor with respect to the binder of 93 wt % achieves (BH) max of 2.5MGOe or greater.

Moreover, high magnetic force bond magnets are used in audio-video and office automation equipment, small motors employed in automotive and other electrical components, magnet rolls of copying machines and various other applications in which low-temperature demagnetization is a problem, so that maintenance of high coercivity is desirable.

Although, as taught by Reference, the filling factor with respect to the binder can be increased to achieve high magnetic force by appropriately blending fine and coarse powders, the coercivity is liable to decrease when the filling factor is increased too far. Reference points out that high fluidity is maintained and a molded product having high (BH)max can be obtained even when the filling factor is increased. However, it does not offer any useful teaching regarding how to prevent decrease in coercivity (iHc) when the filling factor is increased.

SUMMARY OF THE INVENTION

An object of the present invention is therefore to overcome this problem

It achieves this object by providing a ferrite magnetic powder for bond magnet, which is a ferrite magnetic powder that includes an alkaline-earth metal constituent and exhibits a decrease in coercivity of not greater than 600 Oe when a specimen thereof is subjected to a molding test consisting of: (1) placing in a mixer and mixing 90 parts by weight of the magnetic powder specimen, 0.4 parts by weight of silane coupling agent, 0.12 parts by weight of lubricant, and 9.48 parts by weight of nylon 6 powder, (2) kneading the obtained mixture at 230° C. and forming it into pellets of an average diameter of about 2 mm, (3) injection molding the obtained pellets at a temperature of 290° C. and molding pressure of 85 kgf/cm$^2$ under a magnetic field orientation of 10 kOe to obtain a cylindrical molded product of 15 mm diameter and 8 mm height (whose direction of magnetic field orientation lies along the center axis of the cylinder), and (4) finding the difference between the coercivity of the molded product measured with a BH tracer and the coercivity of the magnetic powder specimen.

The test can be carried out using a mixer sold by Kyoritsu-rikou Co., Ltd. under the product designation Sample Mill SK-M10, a silane coupling agent sold by Nihonunica Corporation under the product designation A-1122, calcium stearate as lubricant, nylon 6 sold by Ube Industries, Ltd. under the product designation P-1010, and a kneader sold by Toyoseiki Co., Ltd. under the product designation LaboPlust Mill (biaxial batch kneader).

The ferrite magnetic powder exhibiting a decrease in coercive force or coercivity of not greater than 600 Oe when subjected to the molding test preferably has a coercivity in the powder state of 3600 Oe or greater and the molded product obtained by the test preferably has a coercivity 3200 Oe or greater and a residual flux density of 2980 G or greater. The ferrite magnetic powder can be obtained by preparing a fine powder of ferrite magnetic powder having an average particle diameter of greater than 0.50 to 1.0 μm and a coarse powder thereof having an average particle diameter of greater than 2.50 to 5.0 μm and mixing the two powders to incorporate the fine powder at a rate of 15 40 wt %.

DESCRIPTION OF THE PREFERRED EMBODIMENT

When a ferrite magnetic powder is incorporated in a binder at a high filling factor and the result is kneaded, the large shearing load it receives during the kneading and ensuing molding imparts strain to the ferrite crystals. The bond magnet after molding is therefore lowered in coercivity relative to the ferrite powder before molding.

The inventors conducted extensive research and experimentation in search of a way to mitigate this decline in coercivity and learned that by using fine and coarse powders within a different range from that taught by Reference, the decline in coercivity at molding of a bond magnet can be made slight.

Ferrite magnetic powder comes in varying compositions and grain forms. When produced by the dry method, the sequence of the processes is generally: Starting material blending→Pelletizing→Firing→Pulverizing→Washing→ Dewatering/Drying→Crushing→Annealing→Product. The final "Annealing" step is conducted for relieving crystal strain arising during pulverizing after firing (and also during crushing after drying), because the crystal strain occurring during pulverizing and crushing degrades the magnetic properties, particularly coercivity.

After annealing, the ferrite magnetic powder including alkaline-earth metal constituent has a pH of 10-12. This makes its compatibility with binder poor and has a large adverse effect on the viscosity and fluidity of the powder-binder compound. It is therefore preferable to lower the powder pH of the annealed ferrite magnetic powder. Methods available for lowering the powder pH include that of suspending the magnetic powder in water, stirring it well and, as circumstances require, adding a mineral acid to the suspension, and that of stirring the magnetic powder and carbon dioxide gas in the presence of moisture (water).

When the ferrite magnetic powder is used to produce a bond magnet, the filling factor with respect to the binder can be increased by optimizing the ratio between fine and coarse powders as taught by Reference. However, while this makes it possible to obtain high magnetic force, it unavoidably results in the coercivity maintained by the ferrite magnetic powder being lowered at the time of bond magnet molding. The inventors carried out a series of experiments with regard to this point and learned that the decline in coercivity at molding becomes slight when fine powder and coarse powder are mixed within a prescribed ratio range different from the levels taught as preferable by Reference.

The decline in coercivity at molding of a bond magnet can be assessed by a molding test consisting of the steps (1)-(4) set out earlier. When the mixed powder of fine and coarse powders according to the present invention set out above is used, the value obtained by subtracting the coercivity of the molded product acquired in the molding test from the coercivity of the magnetic powder specimen before molding is 600 Oe or less.

The annealing can be conducted before blending the fine and coarse powders but is more conveniently conducted after. The annealing relieves the strain arising within the crystal grains when the fine and coarse powders are obtained by pulverization in the course of production. An annealing temperature of 800-1100° C. is preferable. At lower than 800° C., the effect of the annealing does not reach a sufficient level, resulting in low coercivity and saturation magnetization. At higher than 1100° C., firing proceeds to degrade compression density and orientation.

EXAMPLES

Example 1

(1) Fine Powder Production

Iron oxide and strontium carbonate were weighed out and mixed at a mole ratio of 1:5.5. The mixture was pelletized using water, dried and then fired for two hours at 950° C. in an electric furnace. The fired product was pulverized in a hammer mill (marketed as Sample Mill) and further wet-pulverized in a wet pulverizer (marketed as WetMill) to obtain a fine powder of an average particle diameter of 0.59 μm.

(2) Coarse Powder Production

Iron oxide and strontium carbonate were weighed out and mixed at a mole ratio of 1:5.75. The mixture was pelletized using water, dried and then fired for four hours at 1290° C. in an electric furnace. The fired product was pulverized in the Sample Mill to obtain a coarse powder of an average particle diameter of 3.3 μm.

(3) Mixed Powder Preparation

The fine powder, 30 wt %, and the coarse powder, 70 wt %, were blended by the wet method, filtered, washed with water, dried, crushed and fired (annealed) for one hour at 990° C. in an electric furnace. The powder pH of the fired product was adjusted using carbon dioxide gas and water. A strontium ferrite powder of the following description was obtained as the final dry powder product. The specific surface area shown is that by BET and the compression density value is that under compression at a force of 1 ton/cm$^2$.

| | |
|---|---|
| Average particle diameter: | 1.17 μm |
| Specific surface area: | 2.23 m$^2$/g |
| Compression density: | 3.50 g/cm$^2$ |
| Powder pH: | 9.4 |
| Powder iHc: | 3707 (Oe) |

(4) Bond Magnet Production

Under stirring in a mixer (Sample Mill SK-M10, Kyoritsu-rikou Co., Ltd.), 90 parts by weight of the strontium ferrite powder obtained in (3) was surface treated with 0.4 parts by weight of silane coupling agent (A-1122, Nihonunica Corporation), mixed with 9.48 parts by weight of nylon 6 powder (P-1010, Ube Industries, Ltd.), and further added with 0.12 parts by weight of lubricant (calcium stearate).

The obtained mixture was formed into kneaded pellets of an average diameter of about 2 mm at 230° C. using a kneader (LaboPlus Mill biaxial batch kneader, Toyoseiki Co., Ltd.) and then injection molded at a temperature of 290° C. and molding pressure of 85 kgf/cm$^2$ under a magnetic field orientation of 10 kOe to obtain a 15 mm diameter×8 mm height cylindrical anisotropic bond magnet.

The magnetic properties of the magnet were measured with a BH tracer. It had a maximum energy product (BH) max of 2.20 MGOe and an iHc of 3308 Oe. The decline in coercivity iHc between that before molding and that of the molded product was thus 399 Oe. The properties of the ferrite powder and the properties of the bond magnet obtained in this Example are summarized in Tables 1 and 2.

Comparative Example 1

A strontium ferrite powder was produced under the same conditions as in Example 1, except that 100 wt % of coarse powder was used with no addition of fine powder. Specifically, only the coarse powder obtained in (2) of Example 1 was wet-pulverized, filtered, washed, dried, crushed and fired (annealed) for 1 hour at 990° C. The powder pH of the fired product was adjusted using carbon dioxide gas and water to obtain a strontium ferrite powder of an average particle diameter of 1.49 μm as the final dry powder product.

The obtained powder was used to fabricate a bond magnet as in Example 1, and the properties of the ferrite powder and bond magnet were assessed as in Example 1. The results of the assessment are shown in Tables 1 and 2 in comparison with those of Example 1. As shown in Table 2, the decline in coercivity iHc between that before molding and that of the molded product was 1041 Oe.

Comparative Example 2

(1) Fine Powder Production

Iron oxide and strontium carbonate were weighed out at a mole ratio of 1:5.75 and mixed with the additives. The mixture was pelletized using water, dried and then fired for four hours at 1290° C. in an electric furnace. The fired product was pulverized in a hammer mill (marketed as Sample Mill) and further wet-pulverized in a wet pulverizer (marketed as WetMill) to obtain a fine powder of an average particle diameter of 1.20 μm.

(2) Coarse Powder Production

Iron oxide and strontium carbonate were weighed out at a mole ratio of 1:5.75 and mixed with the additives. The mixture was pelletized using water, dried and then fired for four hours at 1290° C. in an electric furnace. The fired product was pulverized in the Sample Mill to obtain a coarse powder of an average particle diameter of 4.4 μm.

(3) Mixed Powder Preparation

The fine powder, 30 wt %, and the coarse powder, 70 wt %, were blended by the wet method, filtered, washed with water, dried, crushed and fired (annealed) for one hour at 990° C. in an electric furnace. The powder pH of the fired product was adjusted using carbon dioxide gas and water. A strontium ferrite powder of an average particle diameter of 1.44 μm was obtained as the final dry powder product The obtained powder was used to fabricate a bond magnet as in Example 1, and the properties of the ferrite powder and bond magnet were assessed as in Example 1. The results of the assessment are shown in Tables 1 and 2. As shown in Table 2, the decline in coercivity iHc between that before molding and that of the molded product was 811 Oe.

TABLE 1

| | Fine powder | | Ferrite powder properties | | | |
|---|---|---|---|---|---|---|
| | Average particle diameter (μm) | Content ratio (%) | Average particle diameter (μm) | Specific surface area (m²/g) | Compression density (g/cm³) | Powder iHc (Oe) |
| Example | 0.59 | 30 | 1.17 | 2.23 | 3.50 | 3707 |
| Comp. Exmp. 1 | No fine powder | | 1.49 | 1.61 | 3.38 | 3641 |
| Comp. Exmp. 2 | 1.20 | 30 | 1.44 | 1.73 | 3.44 | 3280 |

TABLE 2

| | Bond magnet magnetic properties (nylon 6, ferrite 90 wt %) | | | | |
|---|---|---|---|---|---|
| | Molding density (g/cm³) | Residual flux density Br (G) | Coercivity iHc (Oe) | Max. energy product (BH)max (MGOe) | Coercivity difference before/after molding (Oe) |
| Example | 3.76 | 2989 | 3308 | 2.20 | 399 |
| Comp. Exmp. 1 | 3.76 | 2977 | 2600 | 2.19 | 1041 |
| Comp. Exmp. 2 | 3.76 | 2988 | 2469 | 2.18 | 811 |

As can be seen from the results shown in Tables 1 and 2, the bond magnet of Example 1 has about the same molding density, residual flux density and maximum energy product as those of Comparative Examples 1 and 2. However, its difference in coercivity between before and after molding is, at 399 Oe, well within 600 Oe, in contrast to the high differences of 1041 Oe and 811 Oe for those of Comparative Examples 1 and 2. The decline in coercivity at the time of bond magnet molding is thus smaller in the case of the ferrite magnetic powder of Example 1 than in the case of the ferrite magnetic powders of Comparative Examples 1 and 2.

As is clear from the foregoing explanation, the present invention provides a ferrite magnetic powder for bond magnet that experiences only small decrease in coercivity when molded into a bond magnet and that, as such, is useful in applications requiring high coercivity.

What is claimed is:

1. A ferrite magnetic powder for a bond magnet, which is a ferrite magnetic powder comprising strontium as a constituent element and that is a mixed powder obtained by mixing a fine powder of the ferrite of an average particle diameter of greater than 0.50 to 1.0 μm and a coarse powder of the ferrite of an average particle diameter of greater than 2.50 to 5.0 μm at a ratio to incorporate the fine powder at a content ratio of 15-40 wt. %.

* * * * *

UNITED STATES PATENT AND TRADEMARK OFFICE
CERTIFICATE OF CORRECTION

| | | |
|---|---|---|
| PATENT NO. | : 7,255,807 B2 | Page 1 of 1 |
| APPLICATION NO. | : 10/829291 | |
| DATED | : August 14, 2007 | |
| INVENTOR(S) | : Senda et al. | |

It is certified that error appears in the above-identified patent and that said Letters Patent is hereby corrected as shown below:

Title page: item [73] Assignee: should read as follows:

Nippon Bengara Kogyo Co., Ltd., of Okayama, JP

Column 2, line 12:
"powders to incorporate the fine powder at a rate of 15 40 wt"
should read:
"powders to incorporate the fine powder at a rate of 15-40 wt"

Signed and Sealed this
First Day of May, 2012

David J. Kappos
*Director of the United States Patent and Trademark Office*